US008617343B2

(12) United States Patent
Shinoda et al.

(10) Patent No.: US 8,617,343 B2
(45) Date of Patent: Dec. 31, 2013

(54) MANUFACTURING METHOD OF FLAT-PANEL DISPLAY DEVICE AND BONDING PRESS APPARATUS THEREFOR

(75) Inventors: Tatsuya Shinoda, Kanagawa (JP); Takayuki Iizuka, Ishikawa (JP); Hideo Shibata, Tokyo (JP); Yukinori Ueda, Ishikawa (JP); Susumu Otani, Ishikawa (JP); Toshifumi Shimizu, Nagano (JP)

(73) Assignee: Japan Display Central Inc., Fukaya-shi, Saitama (JP)

( * ) Notice: Subject to any disclaimer, the term of this patent is extended or adjusted under 35 U.S.C. 154(b) by 427 days.

(21) Appl. No.: 12/977,389

(22) Filed: Dec. 23, 2010

(65) Prior Publication Data

US 2011/0155317 A1 Jun. 30, 2011

(30) Foreign Application Priority Data

Dec. 25, 2009 (JP) ................................ 2009-294740

(51) Int. Cl.
| B29C 65/00 | (2006.01) |
| B29C 65/48 | (2006.01) |
| B32B 17/00 | (2006.01) |
| B32B 37/00 | (2006.01) |
| B32B 38/04 | (2006.01) |
| C03C 27/00 | (2006.01) |

(52) U.S. Cl.
USPC ......... 156/295; 156/104; 156/275.5; 156/286

(58) Field of Classification Search
USPC .............. 156/60, 99, 104, 228, 272.2, 275.5, 156/285, 286, 295, 349, 350, 358, 379.6, 156/379.8, 381, 382, 538, 539, 556, 580
See application file for complete search history.

(56) References Cited

U.S. PATENT DOCUMENTS

| 2003/0145944 A1* | 8/2003 | Lee et al. ...................... 156/285 |
| 2007/0046874 A1 | 3/2007 | Adachi et al. |
| 2009/0183819 A1 | 7/2009 | Matsuhira |
| 2009/0283211 A1 | 11/2009 | Matsuhira |

FOREIGN PATENT DOCUMENTS

| JP | 9-133912 | 5/1997 |
| JP | 2000-191985 | 7/2000 |
| JP | 2004-325788 | 11/2004 |
| JP | 2005-55641 | 3/2005 |
| JP | 2009-048214 | 3/2009 |
| JP | 2009-175701 | 8/2009 |

OTHER PUBLICATIONS

Japanese Office Action—Notification of Grounds for Refusal of Japanese Application No. 2010-288549 dated Apr. 23, 2013, 4 pages.

* cited by examiner

*Primary Examiner* — Philip Tucker
*Assistant Examiner* — Brian R Slawski
(74) *Attorney, Agent, or Firm* — Finnegan, Henderson, Farabow, Garrett & Dunner, L.L.P.

(57) ABSTRACT

An embodiment of manufacturing method of a flat-panel display device having a display panel and a transparent protector sheet; comprises: applying of adhesive resin onto the transparent protector sheet or the display panel to form dot patterns of applied adhesive resin; seizing the protector sheet and the display panel on upper and lower chucking parts; colliding of undermost tip of the applied resin onto the panel or the protector sheet at an approaching rate no more than a predetermined rate, preferably in a range of 0.01-0.5 mm/sec; and squeezing of the layer by moving the upper or lower chucking part at a rate no less than three times of the approaching rate at a time of the colliding, preferably in a range of 1-10 mm/sec.

9 Claims, 6 Drawing Sheets

MANUFACTURING METHOD OF FLAT-PANEL DISPLAY DEVICE AND BONDING PRESS APPARATUS THEREFOR

CROSS-REFERENCE TO RELATED APPLICATION

This application is based upon and claims the benefit of priority from the prior Japanese Patent Application No. 2009-294740, filed on Dec. 25, 2009; the entire contents of which are incorporated herein by reference.

FIELD

Embodiments described herein relate generally to a method of manufacturing a flat-panel display device, which includes attaching of a protector sheet formed of transparent resin or glass, on a face having a viewing area, of a display panel in a liquid-crystal display (LCD) device or in some other flat-panel display device. The invention also relates to a bonding press apparatus for the attaching, on the display panel or on the protector sheet.

BACKGROUND

The flat-panel display devices such as LCD (Liquid-Crystal Display) devices or OLED (Organic Light Emitting Diode) display devices are widely used in various fields such as computer displays, TV sets, car navigation devices, personal digital assistants (PDAs) and mobile phones. Transparent protector sheets are attached on screen faces of display devices in mobile equipments such as mobile phones and PDAs, in on-vehicle devices such as car navigation devices and in some computer devices. The protector sheet curbs scratching on the screen face to avoid disturbance of visibility, and curbs damaging of the display panel even at a time the display device is fallen to ground or undergoes a strong impact.

In general, the protector sheets have been attached on casings of electronic devices and thus a gap is formed between the protector sheet and the display panel. Please see JP 1997 (H09)-008690A (Japan's patent publication application No. H09-8690). Meanwhile, it has been proposed to attach or paste the protector sheets directly on the screen faces of the LCD devices. Please see JP2004-325788A, JP2005-055641A and US2007/0046874A (JP2007-047621A) and JP1997 (H09)-133912A. This is to cope with problems of light reflection on glass surface due to existence of air layer in the gap and to decrease production cost of the display device.

The JP2004-325788A discloses followings in respect of attaching the protector sheet on the display panel on course of producing the display device. Firstly, ultra-violet (UV) curing resin is applied on a predetermined area on the display panel or on the protector sheet. Subsequently, the display panel and protector sheet are pasted with and then pressed to each other in a chamber vacuumed to absolute pressure of about 50 Kpa or less. Thereafter, vacuuming is relieved, and then ultraviolet (UV) irradiation is made at a non-displaying periphery area on the display panel as to achieve a "temporary bonding". And, if a dust is found to be mingled in the adhesive layer by inspection using a CCD camera, the protector sheet is peeled off and then attaching of the sheet is made again. In the disclosed method, vacuuming is made at a time of pressing in order to curb inclusion of bubbles in the adhesive layer. Meanwhile, FIG. 4 of the JP2004-325788A shows following manners of applying the UV curing resin: dropping on only one circular dot at center; dropping on two to five circular dots having same diameter; dropping to form an X-shaped line pattern; and uniformly applying on whole of to-be-bonded area. The JP2004-325788A asserts in latter half of paragraph 0020 that; "As shown in FIG. 4, adoptable are one-dot dropping and multi-dots dropping, and no bubble inclusion is made by either of the methods."; and by "the multi-dots dropping or uniform applying on whole of the area", "decreasing of time for spreading the UV curing resin is achieved".

Meanwhile, JP2004-325788A describes in 0019 paragraph as follow: "At absolute atmospheric pressure of 50 kPa, the LCD panel is brought onto the protector glass without causing air bubble if rate of approaching rate is set at 0.1 mm/sec". This means that, even with some level of vacuuming, descending rate of the head has been required to be fairly small.

An LCD device disclosed in the JP2005-055641A has spacers that are formed of acrylic resin and are arranged on non-displaying peripheral area of the display panel at between the panel and the protector sheet; in order to achieve uniform thickness of a layer of adhesive that is filled and achieves adhesion between the display panel and the protector sheet. Meanwhile, the US2007/0046874A (JP2007-047621A) discloses an LCD device, in which "the protective plate includes fine concavity and convexity configurations on at least a surface thereof toward the display panel" (claim 1) so that "bubbles trapped . . . release from clearances between the concavities and convexities formed on the protective plate" (paragraph 0017).

Meanwhile, the JP1997 (H09)-133912A discloses a vehicle-mounted LCD device that has a resin sheet having a pressure-sensitive adhesion property and a shock-absorbing property, at between the LCD panel and a protector plate, in place of the adhesive layer.

DETAILED DESCRIPTION

A manufacturing method, according to an embodiment of the invention, of a flat-panel display device that is comprised of: a display panel formed of a transparent insulator substrate;

and a transparent protector sheet attached on viewing area of the display panel; comprises: applying of adhesive resin onto the transparent protector sheet or onto the viewing area of the display panel to form circular or ellipsoidal dot patterns of applied adhesive resin on a to-be-bonded area; reversing the protector sheet or the display panel having on its upside the dot patterns of applied resin so that the dot patterns of applied resin come to and is kept at underside; vacuum chucking from upside the protector sheet or the display panel having on its underside the dot patterns of applied resin, on an upper chucking part; vacuum chucking from underside the display panel or the protector sheet on a lower chucking part; assembling the display panel and the protector sheet so as to sandwich a layer of the adhesive resin; and curing of the adhesive resin sandwiched between the display panel and the protector sheet, and said assembling comprising: (1) approaching of the upper chucking part to the lower chucking part so that approaching rate is no more than a predetermined rate, preferably in a range of 0.01-0.5 mm/sec, more preferably being more than 0.05 mm/sec and not more than 0.3 mm/sec, further preferably in a range of 0.05-0.3 mm/sec, at a time undermost tip of the applied resin in the resin-application pattern is collided with upside surface of the display panel or the protector sheet; and (2) after such colliding, further approaching of the upper chucking part to the lower chucking part to proceed pressing or squeezing of the layer of the adhesive resin at a rate no less than three times of the approaching rate at a time being collided, and stopping the further approaching at a time the thickness of the layer reaches a second predetermined thickness. In a preferred embodiment, said approaching and the vacuum-chucking of the upper chucking part are stopped at a timepoint said undermost tip has just contacted with the upside surface. In a preferred embodiment, pressure for said squeezing on basis of areal size of the to-be bonded area is set in a range of 5-100N/cm$^2$, preferably in a range of 10-50N/cm$^2$, and set in a range of 40-50N/cm$^2$ in a detailed example.

According to the embodiment of the invention, achievable are; curbing of inclusion of air bubbles in the adhesive layer; cutting down of production cost and improving of production efficiency; and decreasing of installation space required for production devices.

The manufacturing method and apparatus disclosed in JP2004-325788A, on FIGS. 2-3 in particular, have a drawback that a press drive mechanism has to be arranged in a vacuum chamber, and thus, dimensions of the vacuum chamber are much larger than those of the display panel. Moreover, the display panel or the protector sheet having been applied with the adhesive resin has to be transferred into the vacuum chamber and then positioned and attached at predetermined position on a base plate of the press device. In particular, when the adhesive is applied onto whole of the to-be-bonded area as shown in FIG. 4(h), initial contacting between the protector sheet and the layer of the adhesive resin becomes surface-to-surface contact; and thus, vacuuming would be almost indispensable.

Meanwhile, structures of the LCD devices disclosed in JP2005-055641A and US2007/0046874A (JP2007-047621A) have a drawback that cost for elements or parts or cost for assembling is increased.

In otherwise, a resin sheet having press-adhesion property or a press-sensitive adhesion sheet may be adopted as in JP1997 (H09)-133912A; then, it is required to establish a manufacturing method that enables efficient bonding without causing inclusion of air bubbles.

In view of the above problems, it is aimed to improve a manufacturing method including a process of attaching a protector sheet formed of glass or transparent resin onto a viewing face (a face including the viewing area) of the display panel as well as a manufacturing device for this method; in a manner to curb inclusion of air bubbles in the adhesive layer, to decrease production cost and increase production efficiency and to decrease a space required for installing the manufacturing devices.

A manufacturing method of an LCD device as well as apparatuses for the method, according to one embodiment of the invention, is explained in following in conjunction with FIGS. 1-7.

The LCD devices in this embodiment are small-sized ones that are now predominantly used in mobile devices such as mobile phones. For example, the LCD device has a viewing area having 2.4 to 2.8 inches of diagonal dimension and having 400×240 pixels for QWVGA resolution with 5/3 aspect ratio, or has a viewing area having 3.0 to 3.5 inches of diagonal dimension and having 800×480 pixels for WVGA resolution with 16/9 aspect ratio, or has a viewing area having 5.0 to 5.5 inches of diagonal dimension and having 1024×480 pixels for a half XGA resolution with 16/9 aspect ratio. In an example shown in FIG. 6, a display panel 5 has a terrace-shaped marginal connection area 51 that is a region on an array substrate 57 jutting out from a counter substrate 56, at one side of a rectangle shape of a display-panel main body 59. Onto the marginal connection area 51, one driver IC chip 52 and one flexible wiring board (FPC) 53 are mounted through an anisotropic conductive film (ACF). A polarizer sheet 54 is attached on each of obverse and reverse faces of the display panel 5. In an example shown in FIG. 7, a display panel 5 has a bezel cover 55 formed of metal and a backlight unit 58. In this application, term of the display panel is construed to encompass not only the examples shown in FIGS. 6-7 but also various ones including a one having driver ICs that are integrally formed on peripheral parts of the array substrate 57.

Figure 1:
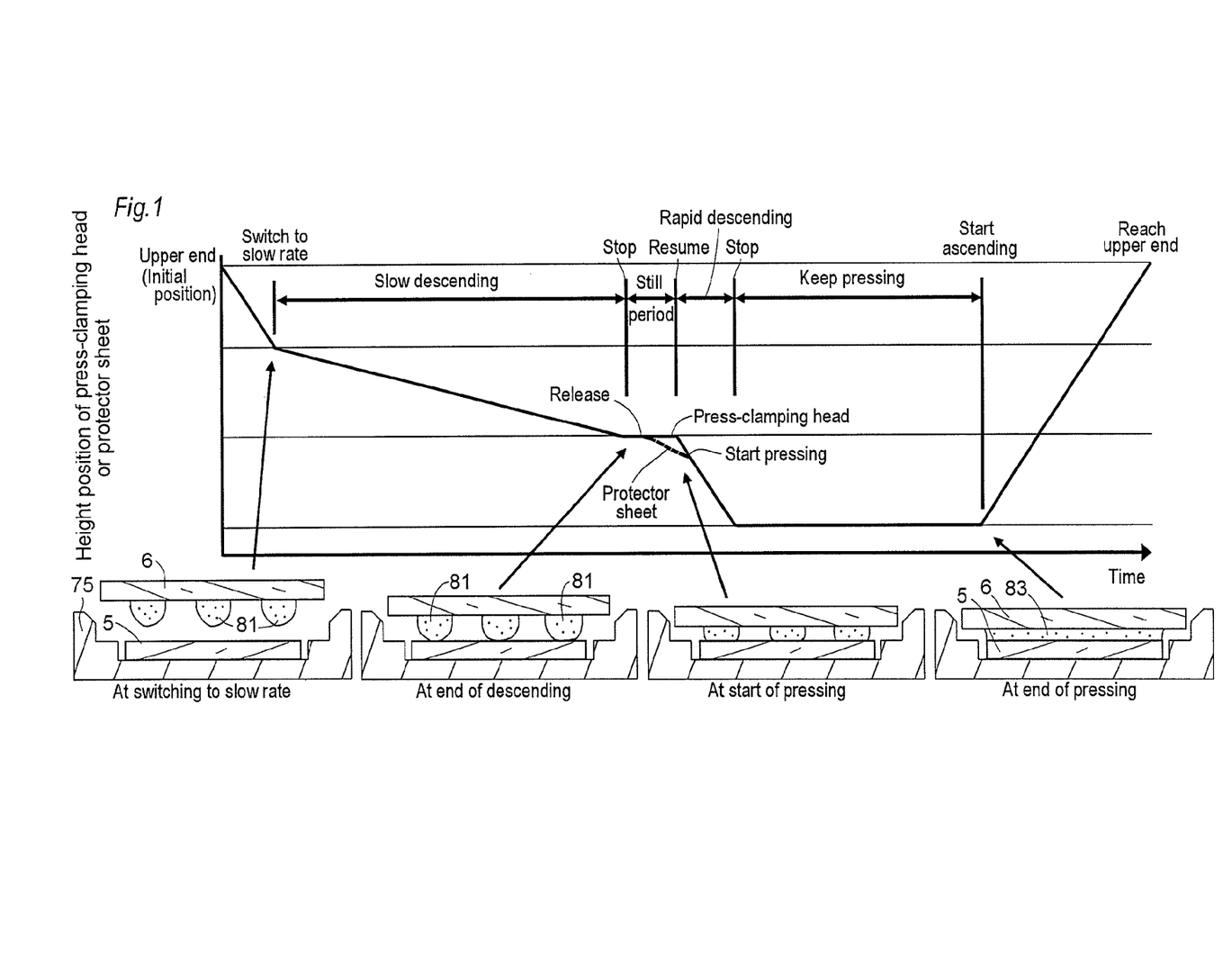
FIG. 1 is a line chart showing a vertical moving pattern of vacuum-chuck press-clamping head, as well as schematic vertical sectional views showing a time course of development of pressing process, according to an embodiment of the invention.
Figure 2:
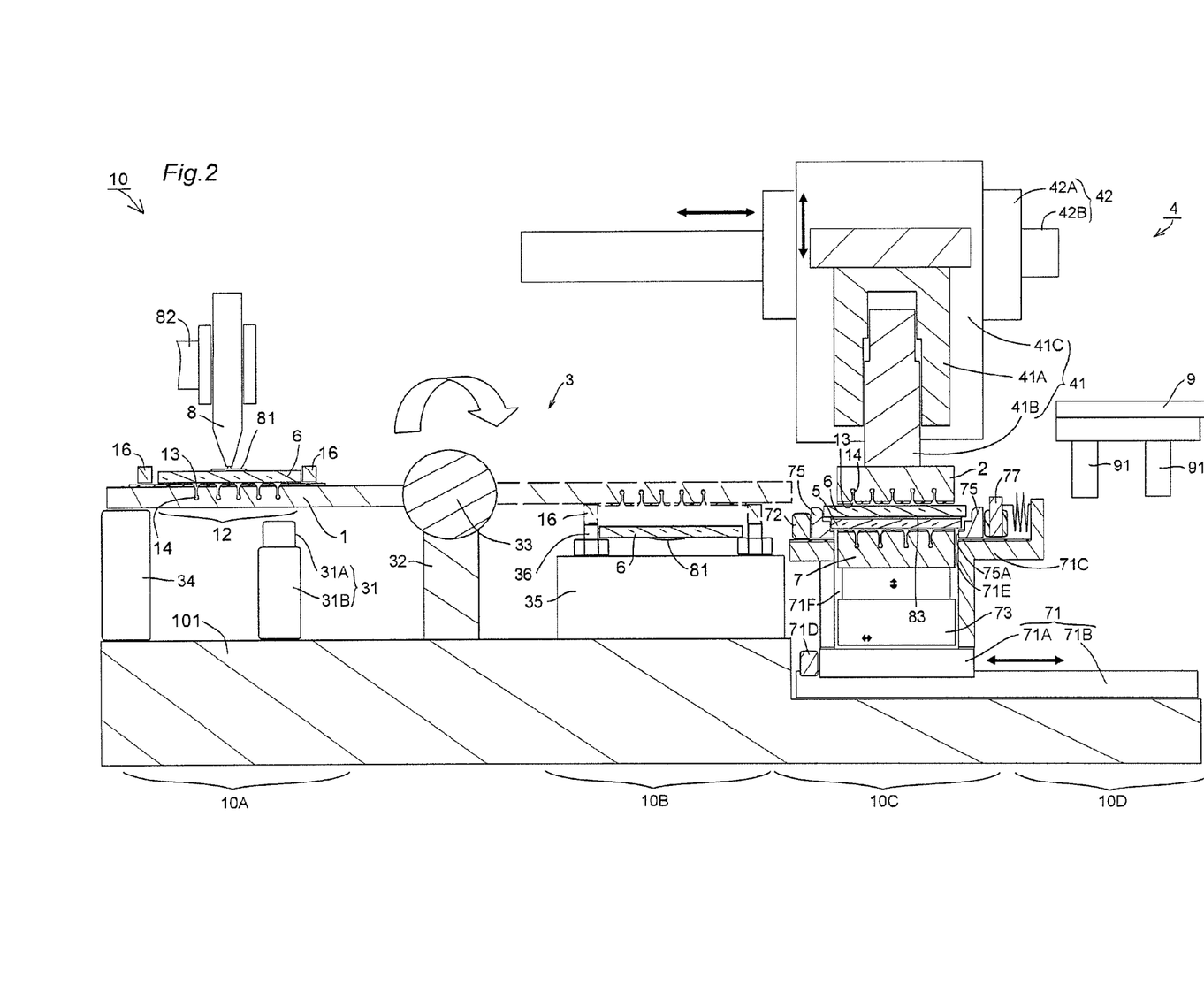
FIG. 2 is a vertical sectional view schematically showing a protector-sheet attaching apparatus that is adopted in an embodiment of the invention.
Figure 3:
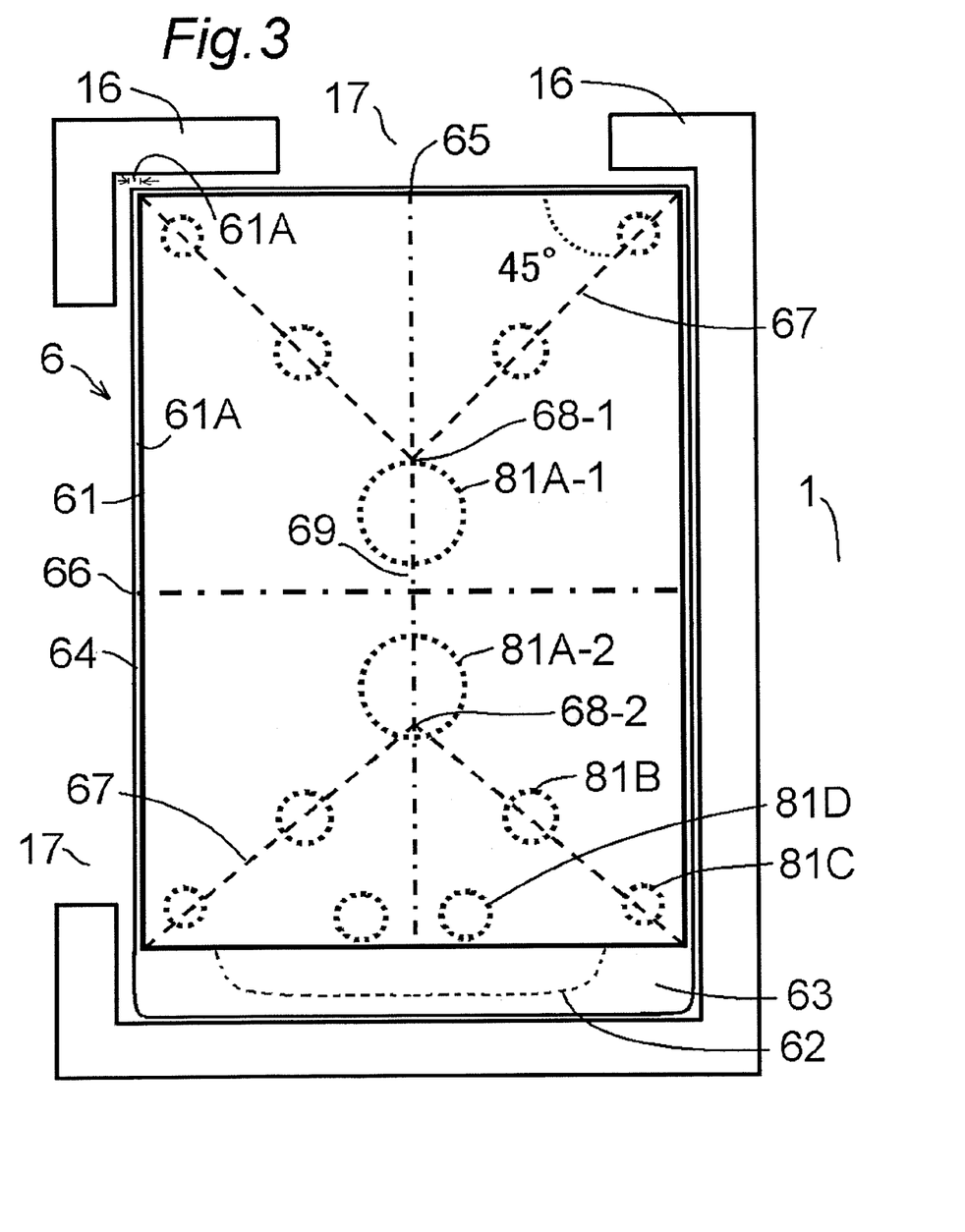
FIG. 3 is a plan view showing an example of adhesive-resin application pattern as well as positioning jigs on an adhesive-application stage or a first vacuum chuck, according to an embodiment of the invention.

A line chart of FIG. 1 shows a detailed example of vertical moving cycle of press-clamping head, according to an embodiment of the invention. A schematic vertical-sectional view of FIG. 2 shows over-all construction of a protector-sheet attaching apparatus 10 according to an embodiment. A plan view of FIG. 3 shows a protector sheet 6 that is to be attached on the obverse face having the viewing area, as well as an example of adhesive-resin application pattern 81 formed on the protector sheet 6.

The protector sheet 6 is a transparent resin plate formed of acrylic resin or polycarbonate resin, or a glass sheet, and has a thickness in a range of 0.5 to 1.0 mm for example. In a detailed example, the protector sheet 6 is an acrylic resin sheet having about 0.7 mm of thickness. Thus, as for adhesive layer, which attaches the protector sheet 6 formed of a resin onto the LCD panel 5 formed of glass, adopted is relatively large thickness of the adhesive layer for example, such as that in a range of 0.05 mm to 0.3 mm or that in a more specific range of 0.08 mm to 0.2 mm (80 μm to 200 μm). In a detailed example, the thickness of the adhesive layer is 0.1 mm (100 μm). As for the adhesive layer, adoptable is a resin composition that is comprised of; a UV-curing epoxy resin modified with silicone elastomer; and precipitated silica added as fillers. The adhesive resin liquid to be applied has a viscosity at 25° C. in a range of 1000-6000 mPa·sec in general, preferably in a range of 2000-4000 mPa·sec. The viscosity of the adhesive liquid is measured as following for example. BH-II viscometer of TOKYO KEIKI ("TOKIMEC") INC. is used; after the adhesive liquid is kept still, a rotor is rotated in the liquid; and then after 30 seconds of rotation, indicated value is read out. It should be noted that: measurement method and viscosity ranges mentioned here are for sake of example; and it is OK unless the resin would not flow down at a time the stage is inverted and unless application of the resin would become troublesome.

As shown in FIG. 2, the protector-sheet attaching apparatus 10 includes a first vacuum-chuck part as an resin-application stage 1, a second vacuum-chuck part as a press-clamping head 2 and a third vacuum-chuck part as a press-clamping stage 7. Each of these vacuum-chuck parts forms a horizontal vacuum-chuck face. The protector-sheet attaching apparatus 10 further includes: a first support-drive mechanism 3 that supports the resin-application stage 1; a resin-application nozzle 8 that applies the adhesive resin onto the protector sheet 6 held on the resin-application stage 2 at a time the stage 2 faces upward; a robot arm 82 that grabs and holds the resin-application nozzle 8; a transfer stage 35 that receives the protector sheet 6 having been applied with the adhesive-resin liquid, at a time the resin-application stage 1 is turned upside down. In an illustrated detailed example, the protector-sheet attaching apparatus 10 further includes: a second support-drive mechanism 4 that hung-wise supports the press-clamping head 2 and moves it vertically and horizontally; and a panel-laying table 71C that is provided with the press-clamping stage 7; and a third support-drive mechanism 71 that supports the panel-laying table 71C from downward.

As shown in FIG. 2, the protector-sheet attaching apparatus 10 that is comprised of: a resin-application station 10A that includes the resin-application stage 1, the resin-application nozzle 8 and the robot arm 82; a protector-sheet transfer station 10B that includes the transfer stage 35 and the first support-drive mechanism 3; a assembling station 10C that includes the press-clamping head 2, a vertical-drive mechanism 35 for vertically moving the press-clamping head 2, as well as the press-clamping stage 7; and a display-panel transfer station 10D that transfers the display panel 5.

As indicated in FIG. 2, a rectangular vacuum-chuck face or area 12 having substantially same dimensions is formed on each of the resin-application stage 1, the press-clamping head 2 and the press-clamping stage 7, which are respectively the first, second and third vacuum-chuck parts. On the each rectangular vacuum-chuck face 12, suction apertures 13 are arrayed in matrix; vacuuming by not-illustrated suction apparatus is applied to the apertures 13 through suction pipes 14 that are arranged at inside covered by the vacuum-chuck face 12.

In following, explained is a process flow in respect of vertical moving of the press-clamping head relative to press-clamping stage, on course of assembling and pressing at the assembling station 10C. On beforehand, as shown in FIG. 2, the protector sheet 6 having been applied with the adhesive resin at the resin-application station 10A is reversed to have the resin-application pattern 81 at underside and then vacuum-chucked on the press-clamping head 2. Meanwhile, the press-clamping stage 7 holds a display panel 5 at a predetermined position in a state the panel 5 is accommodated in a tray-shaped alignment jig 75.

1) 1st phase—rapid descending: If and when the protector sheet 6 and the display panel 5 are held in their predetermined positions in the assembling station 10C, then descending of the press-clamping head 2 is started. The press-clamping head 2 is moved downward rapidly until reaching a position where undermost tip or end of a resin layer of the resin-application pattern 81 is slightly distanced from upside face of the display panel 5; for example, by a predetermined distance in a range of 0.5 mm to 1.5 mm. In an example, rate of descending of the head 2 in the 1st phase, which is to be referred as first descending rate, is set in a range of 0.5 mm/sec to 100 mm/sec, preferably in a range of 1 mm/sec to 10 mm/sec.

2) 2nd phase—slow descending: Descending rate is switched to lower one; and the press-clamping head 2 is further moved downward until the undermost tip of the resin layer is contacted with the upside surface of the display panel 5. In an example, descending rate at this 2nd phase, or 2nd descending rate, is set no more than a predetermined rate, preferably in a range of 0.01-0.5 mm/sec and more preferably in a range of 0.01-0.3 mm/sec, further preferably being more than 0.05 mm/sec and not less than 0.3 mm/sec, still further preferably in a range of 0.05-0.15 mm/sec and set at 0.1 mm/sec in a specific example. The 2nd descending rate is set for example, to be not more than one third of, and preferably be not more than one fifth of, the 1st descending rate.

3) 3rd phase—descending with own weight: Vacuum-chucking of the protector sheet 6 on the press-clamping head 2 is stopped to release the protector sheet 6. Resultantly, solely by weight of the protector sheet 6, the adhesive-resin layer of the resin-application pattern 81 is pressed as squeezed so that the protector sheet 6 is moved downward very slowly. Descending the head 2 is kept to be stopped until elapsing of a predetermined period, or until thickness of the adhesive-resin layer reaches a predetermined thickness. In an example, the predetermined period for stopping is set to be not more than one third of, or preferably be not more than one fifth of, a whole time period for the 2nd phase. In an example, the predetermined thickness, which is to be referred as "1st predetermined thickness", is set in a range of 0.5-0.95 times of a thickness at beginning of this 3rd phase.

4) 4th phase—rapid squeezing: Descending of the press-clamping head 2 is resumed just after elapse of a predetermined stopping period mentioned above. Then, after a little bit of time lag, the protector sheet 6 is pressed by the press-clamping head 2 and thus, the adhesive-resin layer is being squeezed to be extended as being enlarged in area. The time lag corresponds to a distance the protector sheet 6 has moved downward by its own weight. Descending of the press-clamping head 2 in this 4th phase is made rapidly. In an example, descending rate of the head 2 at this 4th phase, which is to be referred as 3rd descending rate, is set in a range of 0.5-100 mm/sec, preferably in a range of 1-10 mm/sec. The 3rd descending rate is set for example, to be not less than three times of, preferably be 5 through 10 times of, the 2nd descending rate. Pressure for the squeezing of the layer of adhesive resin, on basis of the areal size of the to-be bonded area 61, is kept in a range of 10-50N/cm$^2$, preferably in a range of 40N-50N/cm$^2$, by a pressure regulating mechanism for example. Descending of the head 2 is terminated: at a time point pressure level of pressing reaches a predetermined value; or at a time point thickness of the adhesive-resin layer reaches a predetermined thickness, or 2nd predetermined thickness.

5) 5th phase—pressing by standing still: By keeping the head 2 to stand still, pressing is continued for a predetermined period; for a period in a range of 1-5 seconds in an example.

6) 6th phase—ascending to return: After elapse of the predetermined period for pressing, the head 2 is rapidly moved upward to return to initial position. In same time, the press-clamping stage 7 is moved downward after terminating of vacuum-chucking on the display panel 5.

Descending and ascending of the head 2 as well as starting and stopping of the vacuum-chucking is controlled by a not-illustrated control unit. In an example, a programmable controller (PLC) is provided on the assembling station 10C; and overall controlling on the sheet-attaching apparatus 10 and recording of processing conditions are made by a general-use personal computer.

In following, explained are constructions of the resin-application station 10A and a process of applying the adhesive resin.

The resin-application stage 1 is supported from a pedestal 101 of the protector-sheet attaching apparatus 10, through: a hinge supporter 32; and a hinge part 33 that is formed on one side of a rectangular shape of the resin-application stage 1. At along a distal side of the rectangular shape as opposite to the side on the hinge 33 and/or some other positions, the resin-application stage 1 is laid on and supported by a support part 34 if and when the resin-application stage 1 is in an initial state the vacuum-chuck face 12 faces upward. A frame-shaped jig 16, which is for positioning the protector sheet 6 at predetermined position on the vacuum-chuck face 12, is attached on the vacuum-chuck face 12 by screwing or some other fixing mechanism. The protector sheet 6 is duly positioned when having been pushed toward a corner of the jig 16 to abut on inner faces of it.

Once the protector sheet 6 is positioned and vacuum-chucked, the resin-application nozzle 8 drips or discharges the adhesive-resin liquid while being moved by the robot arm 82, as to form a prescribed resin-application pattern 81. And, in many occasions, a black printed pattern 61A is provided to run along whole fringes of the to-be-bonded area 61.

As the resin-application nozzle 8 and the robot arm 82, adoptable with some modification on setting is a dispenser system such as that used for applying of sealing material, which fluid-tightly close up gap space between the array and counter substrates. For example, adoptable is "The DispenseMate 580 Series Dispensing Systems (D-580)" equipped with image processing system, of Nordson ASYMTEK.

The resin-application pattern 81, which is formed on the protector sheet 6, is formed of one or more of dot patterns 81 that are arranged so as to fully let out air on course of squeezing of the adhesive resin layer and extending and enlarging of the dot patterns. In a preferred embodiment, the dot patterns are arranged in accordance with following rule. Please see FIG. 3.

1) Each of the dot patterns 81A, 81B, 81C and 81D is circular or elliptical.

2) The dot patterns 81A, 81B, 81C and 81D are arranged to be symmetric about a center line 65 of the to-be-bonded area 61 and about a perpendicular bisector 66 of the center line 65. This has an exception that a pair of the dot patterns 81D is arranged only along the terrace area 63. These dot patterns 81D are designed so that: the adhesive resin is squeezed out to an area 62 that covers a driver IC chip 52 and its surroundings; and thus, the protector sheet 6 is bonded onto upper face of the driver IC chip 52. In this way, a structure for joining up the display panel 5 and the protector sheet 6 is consolidated; and thus, anti-shocking performance of the LCD device is enhanced. These two dot patterns 81D are arranged to close to corners formed between the center line 65 and the fringe of the to-be-bonded area 61 and are in symmetry about the center line 65. As shown in the illustrated example, the dot patterns 81D for being squeezed out and reinforcing the display panel 5 may be applied in same time with applying of the dot patterns 81A, 81B and 81C. Especially when being arranged as mentioned above, achieved is bonding between the protector sheet 6 and whole top surface of the driver IC chip, or bonding of reverse face of the protector sheet 6 onto part(s) of the display panel 5 other than a face of the viewing area, without causing inclusion of air bubble in the adhesive layer. The dot patterns 81D for such structural reinforcing is not necessarily required to be arranged and may be omitted, according to designing of the flat-panel display device.

3) Each of the dot patterns 81A, 81B and 81C other than the dot patterns 81D is centered on or in vicinity of a line pattern that is defined as follows.

Figure 5:
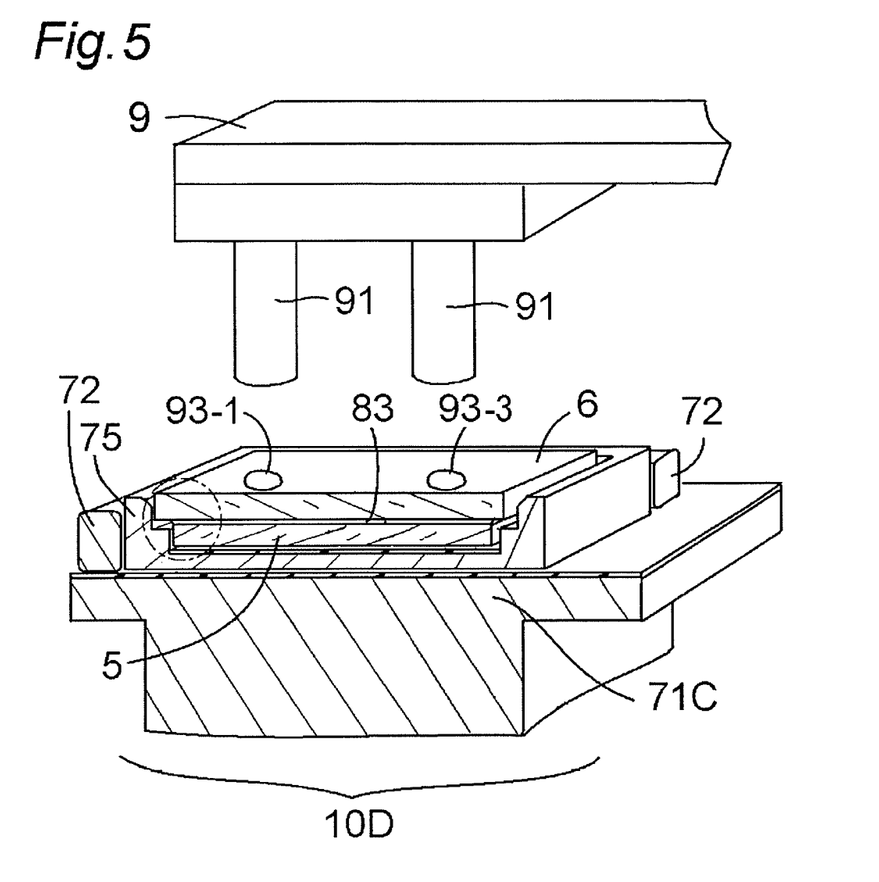
FIG. 5 is a schematic perspective view showing a process of temporary fixing between the display panel and the protector sheet by spot-wise UV irradiation.

Firstly, for each of the four corners of the to-be-bonded area 61, drawn is an angle bisector, which bisects a corner angle of the area 61 and forms 45° angle with a long side and short side of the area 61. Then, first Y-shaped intersection 68-1 is defined as a point at which joined are the two angle bisectors that bisects the corner angles on a short side opposed to the terrace area 63; and second Y-shaped intersection 68-1 is defined as a point at which joined are the two angle bisectors that bisects the corner angles on another short side along the terrace area 63. Each branch line 67 is defined as a line segment of the angle bisector, running from the corner to the Y-shaped intersection 68, or connecting the corner with the center line 65. And, a center-line segment 69 is defined as a line segment running from one to another of the first and second Y-shaped intersection 68-1 and 68-2. The line pattern is consisting of: the center-line segment 69 or modified center-line segment 69A (as shown in FIG. 5); and the four branch lines 67 that runs from ends of the center-line segment 69 or the modified center-line segment 69A.

4) Dispensing amount of the dot patterns 81A on the center-line segment 69 is in a range of 50% to 70% of total dispensing amount. Thicknesses of dispensed resin liquid of the dot patterns 81A, 81B, and 81C are almost same with each other; thus, areal ratios among these are substantially same with respective ratios of dispensing amounts among these. Hence, alternatively adoptable is a rule that areal ratio of the dot patterns 81A on the center-line segment 69 is in a range of 50% to 70% of total area of the resin-application pattern 81 except the dot patterns 81D for the driver IC chip; that is, sum of areas of the dot patterns 81A, 81B and 81C. If the dot patterns 81D for the driver IC chip are arranged, these dot patterns 81D are excluded from the above calculation of the amount ratio or the areal ratio.

In following, it is explained a mechanism of assembling and pressing the protector sheet 6 having the resin-application pattern 81, onto a display panel 5.

As shown in right-hand-side half of the FIG. 2, the second support-drive mechanism 4 supports the press-clamping head 2 from upward, and is supported by a not-illustrated pedestal 101 of the protector-sheet attaching apparatus 10. The second support-drive mechanism 4 is comprised of: a vertical-drive supporter 41 that supports, moves up and down the press-clamping head 2 and carries out driving for the pressing and adjusting of pressure of the pressing; and a horizontal-drive supporter 42 that supports the vertical-drive supporter 41 and the press-clamping head 2 and moves them in a right-left direction of the FIG. 2. In an illustrated detailed example, the vertical-drive supporter 41 includes a cylinder device that enables precise controlling of the pressure being applied and is formed of a cylinder rod 41A and a cylinder barrel 41B. In other words, in a preferred embodiment, the vertical-drive supporter 41 may include an extra mechanism for a precise adjusting of the pressure being applied in addition to a mechanism for a rough or as-prescribed vertical moving of the head 2. Such extra mechanism may be alternatively formed by a pressure sensor and a servo mechanism or by the other various ways. In the illustrated detailed example, a vertical-drive part 41C that, as an actuator, supports and moves up and down the cylinder device, which is supported from a movable part 42A of the horizontal-drive supporter 42 and is movable along a horizontal rail 42B by action of an actuator of the horizontal-drive supporter 42.

In a detailed example, the press-clamping stage 7 is attached on top of a positioning table 73 as illustrated in FIG. 2. The positioning table 73 is a "XYθ stage" that enables fine-tune positional adjustment in two orthogonal axes (X and Y axes) in horizontal plane as well as rotational (θ) direction about vertical axis. Meanwhile, the panel-laying table 71C is supported as horizontally movable from the pedestal 101 through a third support-drive mechanism 71; has an opening 71E on top face, through which the press-clamping stage 7 is movable, and has a cavity 71F that accommodates the positioning table 73 and the press-clamping stage 7.

In an embodiment, movable part of the third support-drive mechanism 71 is connected with the positioning table 73 and the press-clamping stage 7 as well as the panel-laying table 71C; and these are moved by the third support-drive mechanism 71 at a time the positioning table 73 and the press-clamping stage 7 are accommodated in the cavity 71F. In an alternative embodiment, the positioning table 73 and the press-clamping stage 7 are directly supported by the pedestal 101 and are not horizontally movable. In this alternative embodiment, the positioning table 73 and the press-clamping stage 7 are brought into the cavity 71F, through a side-face opening 71G on bottom part of the panel-laying table 71C; at a time the panel-laying table 71C is moved by the third support-drive mechanism 71 after panel-laying table 71C have received on its top face a display panel 5, at the display-panel transfer station 10D. Then, the press-clamping stage 7 is raised as emerged through the opening 71E on the top face and vacuum-chucks the display panel 5.

Figure 4:
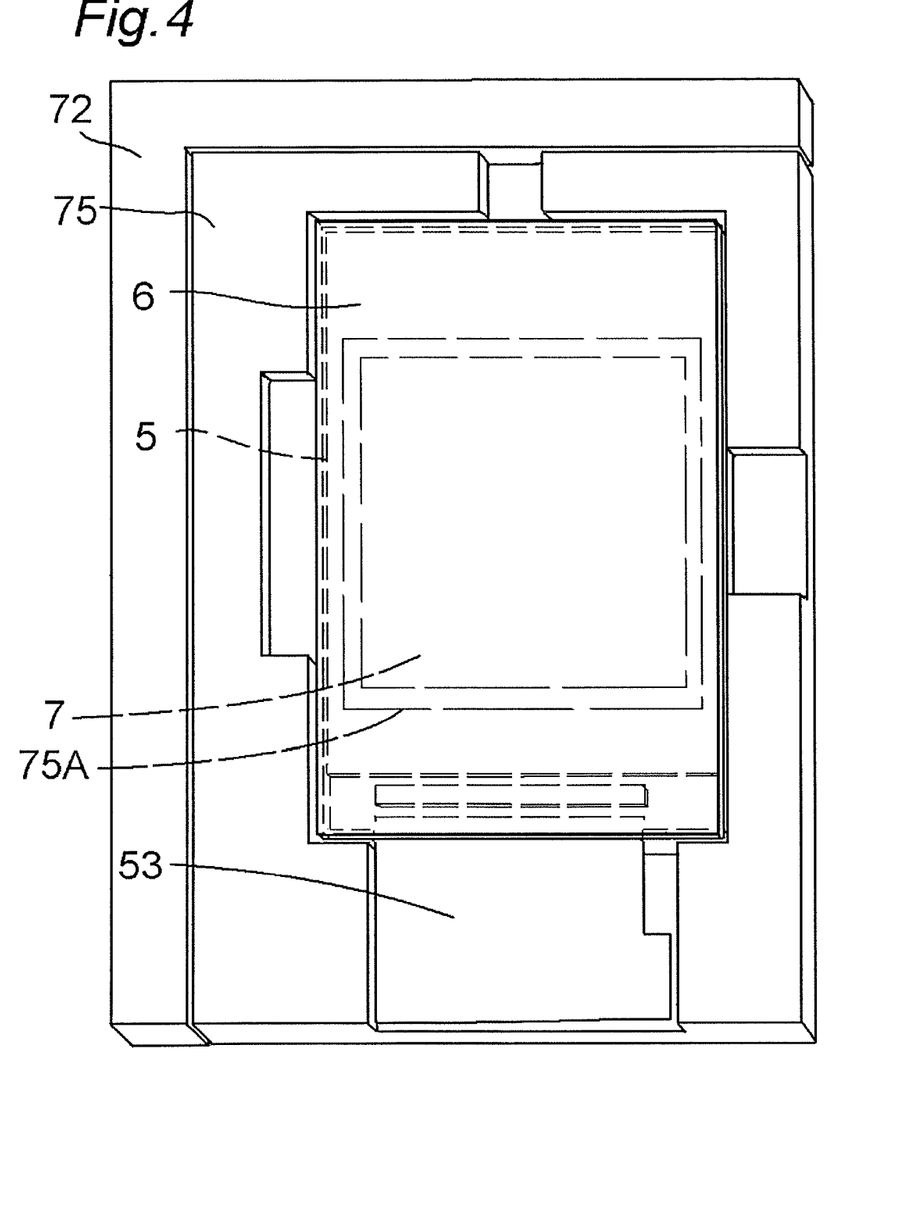
FIG. 4 is a schematic perspective view showing an alignment jig and a positioning jig on a press-bonding stage or third vacuum chuck that are used in an embodiment of the invention.
Figure 6:
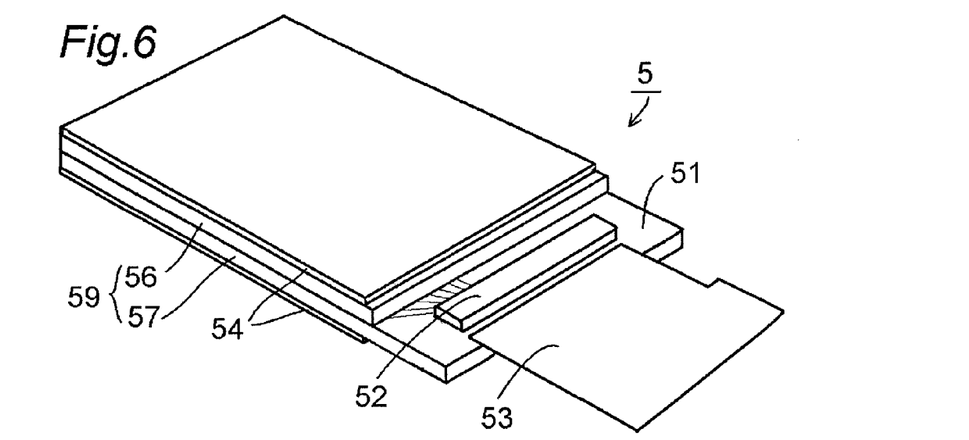
FIG. 6 is a schematic perspective view showing an example of a small-size display panel that has been typical for years.
Figure 7:
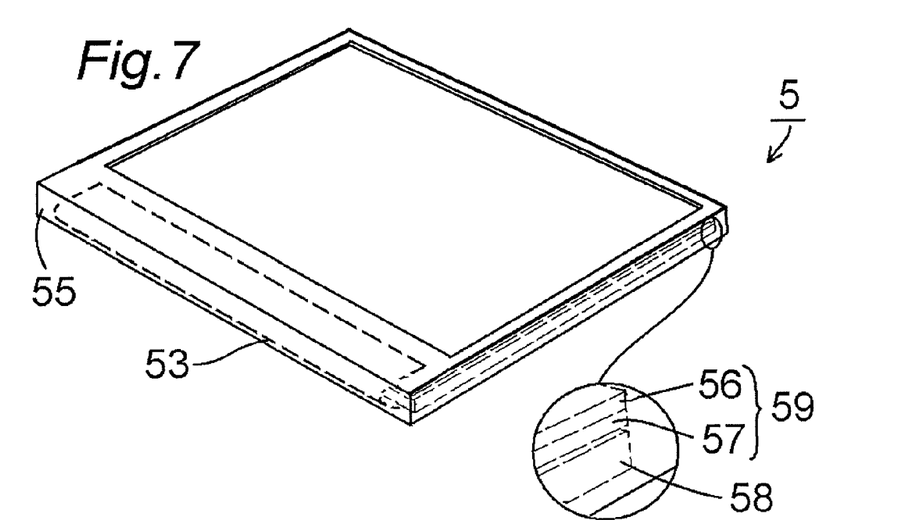
FIG. 7 is a schematic perspective view showing another example of the small-size display panel.

As shown in FIGS. 2 and 4-5, on top face of the panel-laying table 71C, held is a tray-shaped alignment jig 75 that receives the display panel 5. On course of the press-clamping, not only the display panel 5 but also the protector sheet 6 is placed in the alignment jig 75. In FIGS. 2 and 6, the alignment jig 75 has on its bottom face, an opening 75A that is illustrated as congruent or nearly congruent with the opening 71E of the panel-laying table 71C.

As shown in FIG. 2, the third support-drive mechanism 71 that supports and horizontally moves the panel-laying table 71C is comprised of: a slider 71A, on top of which the table 71C is fixed; a horizontal rail 71B that engages with the slider 71A and is fixed on the pedestal 101; and a not-illustrated horizontally driving mechanism that is connected with the slider 71A. In an example, the horizontally driving mechanism is formed of a pneumatic cylinder; and by actuation of such cylinder, the press-clamping stage 7 as the third vacuum-chuck part is quickly moved from the assembling station 100 to the display-panel transfer station 10D and vice versa.

FIG. 5 shows a state the display panel 5 and the protector sheet 6 are aligned with each other within the alignment jig 75; and spot irradiation of UV light in such state. As shown in FIG. 5, the display panel 5 and the protector sheet 6 are clamped together to sandwich a not-cured adhesive resin layer 83 and to be stuck with each other; and within the alignment jig 75, there is achieved alignment between the display panel 5 and the protector sheet 6.

In such aligned state, UV-light spot irradiation is made on predetermined spots 93 by use of spot-irradiation device 9; and resultantly, achieved is a "temporary fixing", or fixing of the protector sheet 6 onto the display panel 5 to keep their aligned state. The spot irradiation may be made at a state the panel-laying table 71C and the alignment jig 75 are out of the assembling station 10C, and may be made at the panel-transfer station 10D.

An assembly formed of the display panel 5 and the protector sheet 6 is firstly subjected to such spot irradiation to fix them with each other in the aligned state; then removed from the alignment jig 75; and sent to full irradiation station, at which whole area of the assembly is irradiated with UV light, or to heat chamber, in which the adhesive layer is cured by heating. The assembly may be taken out from the jig 75 at the panel-transfer station 10D; or the jig 75 with the assembly in it may be taken out from the panel-laying table 71C. In certain circumstance, the jig 75 with the assembly may be placed in a UV irradiation chamber or in the heat chamber.

In following, explained is a process flow of attaching the protector sheet 6 onto the display panel 5 according to an embodiment of the invention, in conjunction with FIG. 2.

1) 1st Step: Setting and Aligning of the Protector 6 on the Stage 1

At a time the resin-application stage 1 as the first vacuum-chuck part is in initial position, the protector sheet 6 is placed in the frame-shaped jig 16 on the stage 1. And, vacuuming through the vacuum-chucking face 12 is made to secure the protector sheet 6 on the stage 1.

2) 2nd Step: Application of Adhesive Resin

The adhesive-resin liquid is discharged from the nozzle 8 while actuating the robot arm 82 so that a predetermined resin-application pattern 81 is formed on the protector sheet 6.

3) 3rd Step: Reversing and Holding of the Protector 6

At a time applying of the resin liquid has been completed, the resin-discharging nozzle 8 is returned to its initial position by the robot arm 82; and then, the resin-application stage 1 is turned upside down. For reversing of the stage 1, actuated is an ejector 31 that is comprised of an ejector pin 31A formed of a resin and a pneumatic cylinder 31B. After the reversing, vacuum suction for holding on the resin-application stage 1 is stopped; and the protector sheet 6 is handed over to the transfer stage 35. When handed over, the protector sheet 6 is kept at a predetermined position horizontally; and its face applied with the resin-application pattern comes to beneath of the sheet. Then, in the illustrated example, the resin-application stage 1 is supported from below at the frame-shaped jig 16 by support pins 36. Meanwhile, the resin-application stage 1 is turned upside down, back to initial position by a not-illustrated ejector same or similar with the illustrated ejector 31.

4) 4th Step: Feeding into the Assembling Station

The press-clamping head 2 as the second vacuum-chuck part is quickly transferred by actuation of the horizontal support-drive mechanism 42 to a position directly above the transferring stage 35. Then, by actuation of the vertical-drive part 41C, the press-clamping head 2 is brought in contact with outer face, or top face in this state, of the protector sheet 6. When thus abutted, the vacuum-chucking on the head 2 is activated to hold the protector sheet 6. Just after this, the press-clamping head 2 is slightly lifted by the vertical support-drive mechanism 41; and is returned to initial position for press-clamping by the horizontal support-drive mechanism 42.

Simultaneously with moving of the press-clamping head 2 to the position just above the transfer stage 35; the panel-laying table 71C is moved in opposite direction by the third support-drive mechanism 71 formed of a pneumatic cylinder or the like, to rightward end in FIG. 2. And, the display panel 5 is pushed into a corner part of the alignment jig 75 that corresponds to the corner of the L-shaped positioning jig 72. Subsequently, the panel-laying table 71C is returned to the press-clamping position simultaneously with that the press-clamping head 2 is returned to there. Then, at this time point, the press-clamping stage 7 is advanced through the opening 75A to abut with the display panel 5 and immediately hold it with the vacuum-chucking.

5) 5th Step: Pressing for Bonding

Press-clamping procedure is initiated after confirming a rough alignment between the panel 5 and the sheet 6. Firstly, the head 2 is moved down as quickly as possible until just before that: lowermost tip of the resin liquid on the resin-application pattern 81, which is attached on bottom face of the protector sheet 6, is contacted with top face of the display panel 5. Subsequently, the head 2 is slowly moved down so that the lowermost tip on the resin-application pattern 81 is slowly brought in contact with the top face of the panel 5. After such preliminary press-clamping, vacuum-chucking of the sheet 6 on the head 2 is stopped; and the protector sheet 6 is positioned, in the tray-shaped alignment jig 75, which corresponds to the corner of the L-shaped positioning jig 72. Thereafter, moving down of the head 2 is resumed to initiate non-preliminary press-clamping, by which: firstly the head 2 is quickly moved down so that air bubbles are released from the adhesive-resin layer 83; and subsequently, moving down of the head is stopped and pressing in-situ or stand-still state is continued for a predetermined period. When such non-preliminary pressing is completed, the press-clamping head 2 is moved up and the press-clamping stage 7 is moved down.

6) 6th Step: Sending Out of Pressed Assembly

When moving up of the head 2 has started, the panel-laying table 71C is moved to a position of transferring the display panel 5. At this position as shown in FIG. 5, some dot portions of the adhesive-resin layer 83 is irradiated with UV light to be cured only at such dot portions as to achieve a "temporary fixing". When the dot portions to be irradiated with UV light are set as irradiation spots 93 illustrated in FIG. 7, adoptable is a spot-irradiation device 9 having four spot-wise UV light-sources 91 formed of LEDs or the like. At a time point such spot irradiation is finished, the positioning jig 75 loaded with the assembly of the panel 5 with the sheet 6 is taken out from the panel-laying table 71C. Then, the positioning jig 75 loaded with a new display panel 5 to be attached with the protector sheet 6 is placed as positioned again on the panel-laying table 71C, which is then returned to the press-clamping position. As the spot-irradiation device 9, adoptable are for example: "high-power UV-LED irradiation device UV-400" (365 nm) of Keyence Corporation; and "UV-LED spot light source LIGHTNINGCURE LC-L1" (365 nm) of Hamamatsu Photonics K.K.

If the alignment jig 75 mounted with the assembly of the display panel 5 and the protector sheet 6 is sent into a UV irradiation chamber as to proceed a following 7th step; then omittable are procedures of the "temporary fixing" using spot-wise UV irradiation.

7) 7th Step: Curing of the Adhesive Layer

After the above "temporary fixing", the assembly is taken out from the positioning jig 75 and sent into a UV irradiation chamber so that whole area of the adhesive-resin layer 83 is irradiated with UV light. Then, if necessary and as an extent as needed, the positioning jig 75 is kept in a heat-aging chamber or in a weathering-test chamber to complete the bonding.

In here-to explained embodiments, assembling and pressing are made by descending of the press-clamping head 2 that is connected with the vertical-drive supporter 41. Nevertheless, the assembling and pressing in same manner is also achievable by ascending of the press-clamping stage 7 as being moved by a vertical-drive mechanism at between the press-clamping stage 7 and the positioning table 73 as indicated in the FIG. 2. Moreover, if appropriate and feasible, the assembling and pressing may be made from both of the descending and the ascending. Hence, in this application, mere mentioning of descending of the press-clamping head 2 should be construed as relative descending of the press-clamping head 2 with respect to the press-clamping stage 7.

In the above embodiments, it has been explained as if vertical moving rate of the press-clamping head is abruptly changes at a time of transition between the phases. Nevertheless, as needless to say, the moving rate may be smoothly changed; and/or one or more transition periods of intermediate moving rate or standing still may be interposed between the above-mentioned phases.

Adopting of here-to-explained Method of assembling and pressing as well as above-mentioned resin-application patterns 81 is advantageous in that: curbed is remaining of air bubbles in the adhesive layer; and in same time, whole area of the to-be-bonded area is efficiently, and in a short time period, filled with the adhesive resin without causing excess and shortage of the resin in any portion. In other words, when the press-clamping is made, filling with the adhesive resin is made in a short period without remaining of any unfilled portion and without causing overflowing of the resin in any portion of the fringes. In particular, such efficient filling without leaving air bubbles and without overflowing is achieved by a procedure under atmospheric pressure and inexpensive equipments.

Here-to explained method for attaching a protector sheet on a display panel and the apparatus and devices therefore are applicable not only in manufacturing of LCD devices but also in manufacturing of OLED devices and other flat-panel display devices.

Here-to explained Embodiments and Examples are for sake of presenting some examples and not for defining a scope of the inventions. These novel embodiments are able to be enacted by various ways and manners; and modification, changing and omitting of some elements may be made in various ways and manners without departing from gist of the invention. Each of such various embodiments and modifications falls within a literal scope of the invention or within its equivalents.

What is claimed is:

1. A manufacturing method of a flat-panel display device that is comprised of: a display panel formed of a transparent insulator substrate; and a transparent protector sheet attached on the display panel to cover its viewing area; comprising:

applying of adhesive resin onto the transparent protector sheet or onto the viewing area of the display panel to form circular or ellipsoidal dot patterns of applied adhesive resin on a to-be-bonded area;

reversing the protector sheet or the display panel having on its upside the dot patterns of applied resin so that the dot patterns of applied resin come to and is kept at underside;

vacuum chucking from upside the protector sheet or the display panel having on its underside the dot patterns of applied resin, on an upper chucking part; vacuum chucking from underside the display panel or the protector sheet on a lower chucking part;

assembling the display panel and the protector sheet so as to sandwich a layer of the adhesive resin; and curing of the adhesive resin sandwiched between the display panel and the protector sheet; and said assembling comprising:

approaching of the upper chucking part to the lower chucking part so that approaching rate is no more than a predetermined rate at a time undermost tip of the applied resin in the resin-application pattern is collided with upside surface of the display panel or the protector sheet; and further approaching of the upper chucking part, after having been collided, to the lower chucking part at a rate no less than three times of the approaching rate at a time being collided as to proceed squeezing of the layer of the adhesive resin, and stopping the further approaching at a time the thickness of the layer reaches a second predetermined thickness.

2. A manufacturing method of a flat-panel display device according to claim 1, wherein the approaching rate at a time being collided is more than 0.05 mm/sec and not more than 0.3 mm/sec; and the approaching rate at a time of said squeezing is in a range of 1-10 mm/sec.

3. A manufacturing method of a flat-panel display device according to claim 1, pressure being applied during said squeezing is in a range of 5-100N/cm$^2$.

4. A manufacturing method of a flat-panel display device according to claim 1, said assembling further comprising:
   stopping of said approaching and the vacuum-chucking of the upper chucking part at a timepepoint said undermost tip has just contacted with the upside surface, and leaving the protector sheet or the display panel as released from the upper chucking part to leave the layer of the adhesive resin is squeezed due to weight of the protector sheet or the display panel until thickness of the layer reaches a first predetermined thickness.

5. A manufacturing method of a flat-panel display device according to claim 4, wherein, at a time point of said stopping, distance between the protector sheet and the display panel is in a range of 2-20 times of the second predetermined thickness.

6. A manufacturing method of a flat-panel display device according to claim 4, said assembling further comprising:
   on-before-hand approaching of the upper chucking part to the lower chucking part until the undermost tip of the applied resin comes to just above the upside surface, at a rate no less than three times of the approaching rate at a time being collided; and
   keeping of pressing the layer by keeping a distance between the upper and lower chuck parts for a time period no less than three times of that of said leaving.

7. A manufacturing method of a flat-panel display device according to claim 6, wherein said rates no less than three times before and after being collided is in a range of 0.5-100 mm/sec.

8. A manufacturing method of a flat-panel display device according to claim 6, wherein the time period of said keeping of pressing is in a range of 1-5 seconds.

9. A manufacturing method of a flat-panel display device according to claim 1, wherein the adhesive resin is cured with irradiation.

* * * * *